United States Patent

[11] 3,597,588

| [72] | Inventors | Robert F. Kirschner<br>Stoughton, Mass.;<br>John A. Clark, Jr., East Stroudsburg, Pa.;<br>Lemuel J. Morgan, Stroudsburg, Pa. |
|---|---|---|
| [21] | Appl. No. | 39,982 |
| [22] | Filed | May 25, 1970 |
| [45] | Patented | Aug. 3, 1971 |
| [73] | Assignee | The Patterson-Kelley Co., Inc.<br>East Stroudsburg, Pa. |

[54] BUILDING SERVICE WATER HEATING SYSTEM
8 Claims, 1 Drawing Fig.

[52] U.S. Cl............................................. 219/314,
122/32, 219/327, 219/485
[51] Int. Cl........................................... H05b 3/78
[50] Field of Search.................................. 219/310,
312, 314, 316, 321, 322, 327, 328, 485; 122/32;
165/108

[56] References Cited
UNITED STATES PATENTS

| 2,522,948 | 9/1950 | Hoffmann | 165/108 X |
| 3,276,517 | 10/1966 | Lowe | 165/108 X |
| 3,383,495 | 5/1968 | Laube et al. | 219/321 |
| 3,484,580 | 12/1969 | Morgan | 219/321 X |

Primary Examiner—J. V. Truhe
Assistant Examiner—C. L. Albritton
Attorney—Bean and Bean ABSTRACT: A building service power consumption rate-monitored electric water heating system featuring provision, in functional combination, a water storage tank; a multistep wired electric immersion heater in heat exchange association with a shroud arranged at its inner end in fluid flow communication with the interior of the tank and at its outer end with the intake of a pump, the pump being arranged to discharge through a distributor conduit back into the tank, thereby providing a circulating flow. A heated water takeoff connection is located at the top of the tank, and a cold water inlet connection is located in the lower level of the tank. An electric power supply monitoring mechanism to limit the entire building power consumption rate to a prescribed maximum is provided, to make power available in suitable increments to the water heater only when total power consumption will not exceed the prescribed maximum. Means for regulating rate of flow output of the pump is provided to be automatically responsive to temperature changes in the water as delivered by the pump by means of a water temperature sensor, and the system is so arranged as to adjust the circulating flow rate in accordance with that required to permit the heater to raise to a prescribed temperature the water being delivered by the pump. Thus, the water moving in heat exchange relation with the heater is drawn from the body of the tank and delivered into the region of the heated water takeoff connection at the prescribed temperature. The pump output flow rate control means may comprise a valve which is operative to regulate the water circulation rate so as to approach a uniform temperature throughout the body of the storage tank. As an alternative to the use of a pump throttling valve arrangement, a variable speed pump may be employed under control of a water temperature sensor located in the conduit leading away from the pump.

PATENTED AUG 3 1971　　　　　　　　　　　　　3,597,588
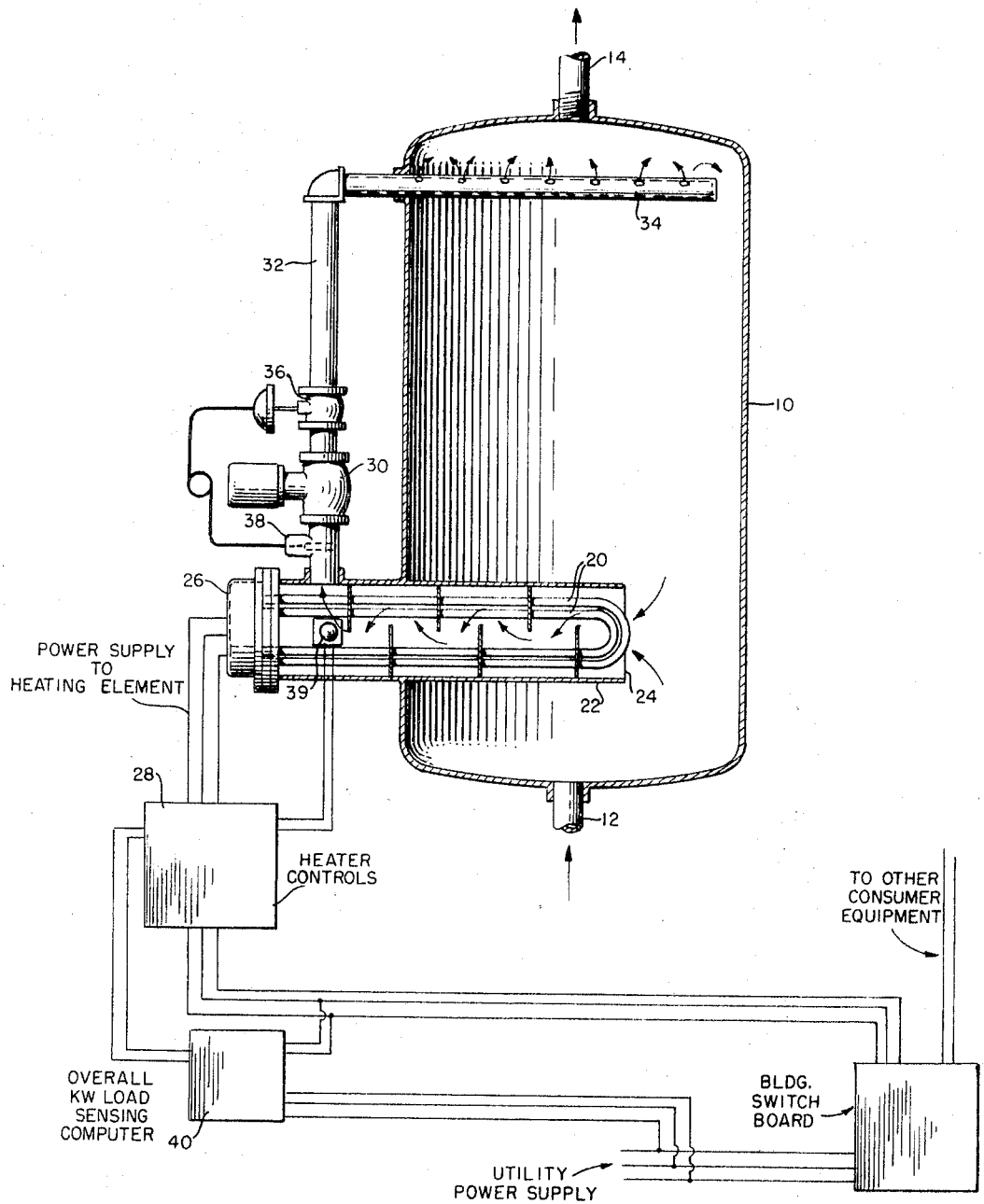
INVENTORS
ROBERT F. KIRSCHNER
JOHN A. CLARK JR.
LEMUEL J. MORGAN
BY
Bean + Bean
ATTORNEYS

BUILDING SERVICE WATER HEATING SYSTEM

BACKGROUND AND OBJECTS OF THE INVENTION

Electric power supply facilities typically offer very favorable limited load and/or offpeak hour price rates. In consequence, it is economically desirable to employ a water heating system wherein the heaters are multistage operable so as to provide at least limited supply of water at the desired temperature, while at all times limiting the power consumption rate to a prescribed maximum.

Many arrangements have been previously proposed for taking advantage of the so-called maximum load and "offpeak" electric utilities power rates as explained hereinabove; the typical approach being to time-clock over-control the heating cycles of the electric heater system so as to limit its power consumption to the "offpeak" hours. In consequence, such systems usually contemplate employment of oversize storage tanks, so as to accommodate sufficient volumes of water as may be heated during the "offpeak" hours which will satisfy (in the role of a hot water storage facility) the demand for heated water during the peak hot-water demand hours. However, such systems have heretofore proved to be less than satisfactory for several reasons.

For example, a system of this type embodying an adequate safety factor with respect to the volume of stored heated water would require an exorbitant capital investment. Therefore, such systems are usually engineered to minimum operational factors, and include inadequate provisions for accommodation of unexpected plumbing accidents and/or misuse of the heated water supply. Furthermore, such prior type water heating systems are typically propense to pump agitation and thermal syphon induced stirrings of the storage tank contents; whereby water at only approximately the mean temperature of the tank contents is usually available at the takeoff connection.

The present invention distinguishes from the prior art in that it provides a simple and accurately functioning system for insuring delivery of the desired supply of water at the desired temperature to the storage tank takeoff connection. At the same time the system is monitored from the power consumption rate standpoint so as to take advantage of the currently available power supply utility "offpeak" limited load price rates. Specifically, the invention contemplates a water heating apparatus which lends itself with improved results to installations employing discriminating power supply monitoring systems such as automatically limit the power service to the water heating apparatus to periods when the other (preferred) loads on the same meter are heavy. Thus, penalties or so-called kilowatt demand "over-charges" such as are usually imposed by the supply utilities for any power consumption over certain scheduled rates during prescribed periods, may be avoided.

THE DRAWING

The drawing herewith illustrates a water heating and supply apparatus in elevation and in vertical section; and diagrammatically illustrates in combination therewith a power supply control system of the present invention.

DETAILED DESCRIPTION OF THE INVENTION

As illustrated by the drawing herewith, the invention may be embodied in a heated water supply system including a water storage tank 10 having a cold water inlet connection 12 at the bottom level thereof, and a heated water takeoff connection as indicated at 14 through the "ceiling" portion of the tank. The tank may be heat-insulated and/or provided with other conventional appurtenances (not shown) as may be preferred.

In accord with the present invention a system of any required number of functionally separate immersion type electric heater elements as indicated at 20–20 is shrouded as indicated at 22, and is so positioned as to extend through a lower wall portion of the tank; the inner end of the shroud 22 being open as indicated at 24. At its outer end the shroud 22 is enclosed by a bonnet 26 into which the terminals of the heating elements 20–20 extend for electrical connections to their power supply leads coming from the nearby control panel 28, the contents of which will be explained hereinafter.

A water circulating pump as indicated at 30 is arranged to have its intake in open communication with the interior of the shroud 22 adjacent the outer end thereof, and is automatically controlled to operate whenever the heater elements 20 are energized. The outlet of the pump 30 connects by means of a conduit 32 into a distributor conduit 34 which extends into the interior of the tank 10 just under the ceiling portion thereof, and is therefore disposed closely adjacent the takeoff connection 14. Hence, it will be appreciated that operation of the pump 30 will cause water from the lower interior of the tank 10 to be drawn into and through the shroud 22 in heat exchange relation with the elements 20–20; and thence through the pump and into the distributor conduit 34 for discharge into the uppermost level of the tank.

It is a particular feature of the invention that a pump throttling valve device such as is illustrated at 36 is connected in the line of the conduit 32 to control the rate of flow of water through the heater in response to operation of the pump. The function of the valve 36 is to tailor the rate of water passage through the heat exchanger shroud according to the temperature of the water being drawn through the shroud; so that the water being delivered by the pump into the uppermost level of the tank is at the desired temperature for withdrawals through the outlet 14. This result is attained by employment of a flow regulator type valve which is automatically responsive to the temperature of the water passing by a sensor as shown at 38, whereby to constantly adjust and readjust the rate of water flow through the heat exchanger so that the water delivered by the pump will at all times be at the desired temperature.

The drawing herewith illustrates the power supply and wiring diagram of a typical control system for the apparatus of the invention. It will be apparent that flow through the pump 30 will be primarily regulated by the thermostat 38, while the power supply to the heating elements will be regulated primarily by a sensor 39; the latter being monitored by a K.W. sensing computer as indicated at 40 so as to at all times operate only within the parameters of the supply utility load limit or demand and/or offpeak rate schedules.

Thus, there is provided a water heating system which is operative so that although, when only a minimum of electric power is available in accordance with a prescribed maximum total load over-control device and when the tank is nearly depleted of suitably heated water, the water which at the moment is in heat-exchange relation with the heater will nevertheless be heated and immediately pumped to the top of the tank and delivered into the region of the hot water takeoff outlet. Thus, this water will have been automatically brought up to proper temperature by reason of operation of the control system. Since this heated water is of lower density it will therefore remain at the top of the tank, and in position so as to be first drawn from the tank whenever hot water is required from the system.

It is quite common in offpeak water heating systems to provide a thermal override control so that some hot water will be available from the outlet when the heated water supply is depleted; to accommodate for example for plumbing accidents or wasteful misuse of water from the tank. In typical cases, to protect against such eventualities, arrangements are made whereby approximately one-third of the components of the electric heater unit are energized; such as for example whenever the water temperature drops down to the vicinity of 120° or 125°. Energization of all of the electric heater elements is avoided because that would increase the operator's peak electrical demand rate, which would result in a higher monthly billing rate. Thus, in conventional systems the heater will under such conditions deliver only partially heated water.

However, in the case of the present invention in a situation as above described the power supply control mechanism will turn on only enough power to produce a predetermined amount of properly heated water per minute. The control valve and pumping system will then regulate themselves so that only that much water is pumped through the unit per minute, whereby water will be delivered to the top of the tank at proper temperature.

Thus, it will be understood that the present invention features a water heating system which includes a single compact storage tank and a self-regulating temperature-controlled valve responsive to the temperature of the water passing through the pump to control the rate of water displacement through the electrical heater unit. As the water exists from the heating elements it is delivered directly into the region of the tank outlet, and thus the immediately deliverable water supply is maintained at the desired temperature. Therefore, the invention provides an improved electric water heating system which lends itself uniquely and with improved facility to an electric power supply over-control arrangement to make power available to the water heater only at such times as power is available, and/or operates in any case to limit the total building power consumption rate to a prescribed maximum. This is because whenever the prime control sensor 39 calls for more heat, whatever power is available (as monitored by the override load sensing computer control 40) will be applied directly and only to the water being delivered to the tank outlet. Hence, the most efficient use is made of whatever power is available under marginal power supply conditions.

What we claim as our invention is:

1. An electric water heating system including a water storage tank having a feed water inlet connection, and a heated water withdrawal conduit leading from an upper level of said tank, a shroud arranged at its inner end in open fluid communication with the interior of said tank, an electric heater disposed in association with said shroud to heat water passing therethrough, a heated water conduit conducting water from a portion of said shroud remote from its inner end and delivering it into close association with said withdrawal conduit, means forcing flow of water out of said shroud into the line of said heated water conduit, and water flow rate regulating means operating in response to variations in temperature of the water flowing through said heated water conduit so as to appropriately control the rate of flow of water through said shroud in heat exchange relation with said heater so as to maintain the water being delivered to said withdrawal conduit within a prescribed temperature range.

2. An electric water heating system as set forth in claim 1 wherein said feed water inlet connection is into the lower level of said tank.

3. An electric water heating system as set forth in claim 2 wherein said water flow rate regulating means comprises a flow rate control valve disposed in said heated water conduit.

4. An electric water heating system as set forth in claim 2 wherein said water flow rate regulating means comprises means controlling the discharge flow rate operation of said pump.

5. A heating system as set forth in claim 3 wherein a multistep power control thermostat is disposed in the path of the heated water flow through said shroud, and is operable to regulate supply of electric power to said heater.

6. A heating system as set forth in claim 4 wherein a multistep power control thermostat is disposed in the path of the heated water flow through said shroud, and is operable to regulate supply of electric power to said heater.

7. A heating system as set forth in claim 3 wherein the power supply to said heater is under control of a load computer operable to preclude supply of power to said heater whenever the total load measured by the computer is in excess of a prescribed maximum rate.

8. A heating system as set forth in claim 4 wherein the power supply to said heater is under control of a load computer operable to preclude supply of power to said heater whenever the total load measured by the computer is in excess of a prescribed maximum rate.